April 11, 1961 R. T. MAITLAND 2,979,554
INSULATED MOUNTING CLAMP FOR ELECTRICAL COMPONENTS
Filed June 17, 1959
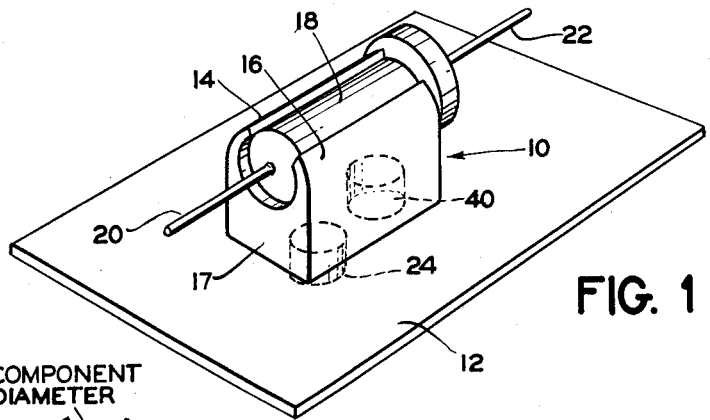
FIG. 1
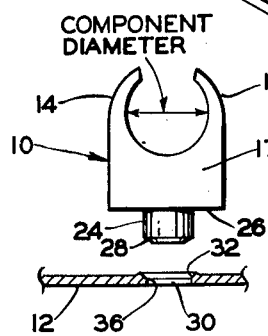
FIG. 2
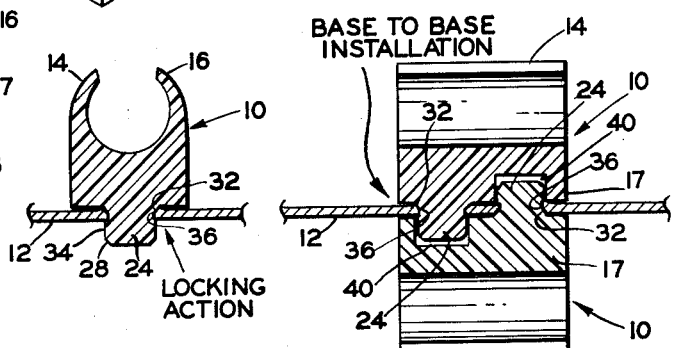
FIG. 3
FIG. 4
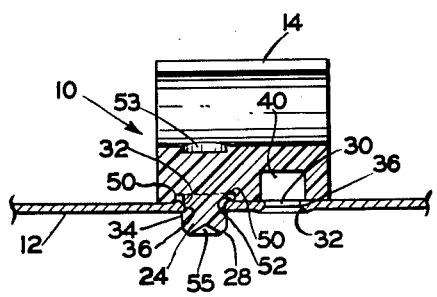
FIG. 5
INVENTOR.
ROBERT T. MAITLAND
BY Herbert L. Davis
ATTORNEY

United States Patent Office 2,979,554
Patented Apr. 11, 1961

2,979,554

INSULATED MOUNTING CLAMP FOR ELECTRICAL COMPONENTS

Robert T. Maitland, Franklin Lakes, N.J., assignor to The Bendix Corporation, a corporation of Delaware Filed June 17, 1959, Ser. No. 820,969

6 Claims. (Cl. 174—138)

The invention relates to an improved mounting clamp for electrical components and more particularly to an improved mounting clamp molded of an electrical insulating material having inherent resilient qualities and a base portion with means formed integral therewith for releasably securing an electrical component thereto, together with a unique stud portion formed integral with the base and projecting therefrom for securing the mounting clamp to a thin metal supporting plate having a hole provided thereon for receiving the stud in a locking relation.

An object of the invention is to provide an improved mounting clamp to hold or support various types of component parts in relation to a mounting surface, such as a thin metal plate, with a unique fastening stud formed integral with the mounting clamp; moreover, the stud is to be so arranged as to project from the lower surface of the base of the clamp and have a shape such as to afford smooth entry under moderate pressure into a hole provided in the metal plate with a locking action relative thereto against withdrawal of the stud therefrom.

Another object of the invention is to provide a novel mounting clamp having a stud projecting from a portion of the base of the mounting clamp and a cavity provided in another portion of the base of the mounting clamp so arranged that upon two similar mounting clamps being mounted base to base at opposite side surfaces of a thin metal mounting plate, there will be provided a positive locking action between the mounting clamp and the plate against withdrawal therefrom and a further locking action between the stud of the one clamp in the cavity of the other clamp to prevent either clamp from turning relative to the plate.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

In the drawings:

Figure 1 is a perspective view of the novel mounting clamp as applied to a supporting plate and carrying a component of an electrical circuit such as a condenser.

Figure 2 is an end view of the mounting clamp shown prior to insertion of the mounting clamp stud in a hole provided therefor in the supporting plate.

Figure 3 is an end sectional view of the mounting clamp with the stud shown in locking relation in the hole provided in the supporting plate.

Figure 4 is a longitudinal sectional view of a pair of mounting clamps shown in an interlocking base to base relation at opposite side surfaces of a thin wall supporting plate.

Figure 5 is a longitudinal sectional view of a modified form of the mounting clamp.

Referring to the drawing of Figure 1, a mounting clamp embodying the present invention and indicated by the numeral 10 is shown mounted on a thin wall metal supporting plate 12. The mounting clamp is shown as having resilient arms 14 and 16 projecting from a base portion 17 and carrying therebetween a component part such as an electrical condenser 18 having electrical conductors 20 and 22 leading therefrom.

The mounting clamp 10 is molded of a suitable electrical insulating material having inherent resiliency, as for example a plastic nylon like material, and there is formed integral with the base portion 17 of the mounting clamp 10 a stud portion 24 which, as best shown in Figure 2, 3 and 4, projects from surface 26 of the base portion 17. The stud 24 has a chamfered or rounded leading edge 28 at the free end thereof and the stud dimension is held under close control so that the stud 24 may cooperate in locking relation in a hole 30 provided in the plate 12.

The hole 30 in the mounting surface of the plate 12 is provided with a countersunk entry 32 held to a close tolerance dimensionally so as to serve to accept the stud 24 when moderate pressure is applied thereto during installation (interference fit) of the mounting clamp 10 on the supporting plate 12. The shape of the stud 24 is such as to afford smooth entry of the stud 24 into the hole 30 through the countersunk entry 32 under moderate pressure, i.e., the leading edge 28 of the stud 24 is chamfered or smoothly rounded.

When the thus chamfered stud 24 enters the countersunk entry 32 and hole 30 in the mounting surface of the plate 12, as a result of the pressure exerted during the installation, the stud 24 will compress and elongate due to resiliency inherent in the molded plastic material thereof, such as for example nylon.

When, as shown in Figure 3, the stud 24 emerges as at 34 from the opposite side of the hole 30, the inherent resiliency of the plastic material causes the stud 24 at 34 to return to its former dimension which is larger than that of the hole 30. The far side of the hole 30 from the mounting clamp 10 is not countersunk, but instead presents a ninety degree corner indicated at 36 so that a locking action will result between the corner 36 and the expanded material at 34 preventing the withdrawal of the stud 24 from the hole 30 and securely fastening the mounting clamp 10 to the supporting plate 12.

There is further provided in the surface 26 of the base portion 17 a cavity 40 positioned in spaced relation to the stud 24 projecting from such base portion 17. Upon two such mounting clamps 10 being applied to the supporting plate 12 at opposite sides thereof, as shown by Figure 4, and in a base to base relation, the stud 24 of one mounting clamp 10 may be inserted through its appropriate securing hole 30 in the plate 12 and into the cavity 40 in the base of the opposite mounting clamp 10 in close fitting relation therewith, while the stud 24 of the other mounting clamp 10 may likewise be inserted through its appropriate securing hole 30 in the plate 12 and into the cavity 40 in the base of the first mentioned mounting clamp 10 in a close fitting relation therewith. As shown in Figure 4, such mounting arrangement through the combined action of the two studs 24 projecting from the respective mounting clamps 10, two holes 30 in the supporting plate 12 and two cavities 40 in the respective mounting clamps 10 will effect a positive locking action which will prevent both the removal and turning of either mounting clamp 10 relative to the supporting plate 12. In the case of a single mounting clamp which positively must not turn on the plate 12, a separate stud may be supplied which can be pressed into a second hole 30 and then into the locking cavity 40 of the mounting clamp 10 as in the case of the stud 24 of the opposite mounting clamp 10.

A modified form of the invention is shown in Figure 5 in which there is provided an annular clearance channel 50 in the surface 26 of the base portion 17 and around the base of the stud 24 so as to clear a ramp portion 52 which may be formed on the surface of plate 12 around the punched hole 30 and thereby allow for a flat mounting of the base surface 26 of the mounting clamp 10 against the surface of the supporting plate 12.

There is further provided in the modified form of the invention a circular recess 53 in an inner surface of the base portion 17 between the arms 14 and 16 and immediately above and in concentric relation with the stud 24. The recess 53 provides a guide for receiving and centering an end of an insertion tool of an arbor press so as to locate the tool immediately above the stud 24 to effectively apply the pressure of the arbor press accurately to the stud 24. Thus during the installation of the stud 24 in the hole 30 of the mounting plate 12 a force is applied to the stud 24 by the arbor press in such a manner as to prevent cocking of the base portion 17 of the mounting clamp 10 relative to the mounting plate 12.

A centering dimple 55 is also provided in the end of the stud 24 so as to provide a guide for a drill in the event of removal of the stud 24 from the plate 12 of Figure 5.

The aforedescribed mounting clamps require no hardware or special tools in securing the same to the supporting plate 12 and are complete in themselves. The clamp may be shaped to adapt it to various purposes even to the extent of providing several studs, such as indicated at 24, for the secure mounting of larger components. Furthermore, the complete absence of metal or metal hardware for securing the mounting clamp 10 to the supporting plate 12 makes the clamp safe when used with electrical components requiring insulated supports and which, as in the case of electrical capacitance devices, might be adversely effected by the presence of metal securing elements such as bolts, rivets and screws.

Although several embodiments of the invention have been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. In a mounting clamp assembly, the combination comprising a relatively thin wall mounting plate, a pair of mounting clamps positioned at opposite sides of the plate; each of said mounting clamps being formed of a resilient plastic material, and each of said clamps including a base portion, resilient means formed integral with said base portion for receiving a device to be held thereby, a resilient stud formed integral with said base portion and extending therefrom, and said base portion having a cavity provided therein for receiving the resilient stud of the other of said pair of clamps; the thin wall mounting plate having a pair of holes therethrough, one of the holes corresponding to the stud of the mounting clamp at one side of the plate and the other of the holes corresponding to the stud of the mounting clamp at the other side of the plate; the stud of each of the mounting clamps having a relatively greater cross-sectional dimension than that of the corresponding hole in the mounting plate, and each of the studs being adapted to be received in the corresponding hole in the plate upon a force being applied thereto; the material of each of the studs being compressed and elongated under such force so as to extend through the corresponding hole from a near side of the plate to a far side thereof and into the cavity provided in the other of said pair of clamps so as to prevent an angular movement of the clamps relative to the mounting plate, and the material of each of the resilient studs being adapted to expand at the far side of the plate upon extending through the corresponding hole in the plate so as to engage in a locking relation with an edge of the plate defining the corresponding hole at said far side of the plate and thereby effectively secure the base portions of said clamps in base to base relation at opposite sides of the mounting plate.

2. In a mounting clamp assembly, the combination comprising a relatively thin wall mounting plate, a mounting clamp of a resilient plastic material; said clamp including a base portion, resilient means formed integral with said base portion for receiving a device to be held thereby, a resilient stud formed integral with said portion and extending therefrom, and said base portion having a cavity provided therein opening at a surface of said base portion adjacent to a surface of the mounting plate; the thin wall mounting plate having a pair of holes therethrough including a first hole corresponding to the stud of the mounting clamp and a second hole corresponding to the opening to said cavity in the base portion of the mounting clamp; said stud having a relatively greater cross-sectional dimension than that of the first hole in the mounting plate and the stud being adapted to be secured in the first hole upon a force being applied to the stud in a sense tending to compress the stud against an edge of the plate defining the first hole and elongate the stud under such force so as to cause the stud to extend through the first hole from a near side of the plate to a far side thereof; the material of the resilient stud being adapted to expand at the far side of the plate upon extending through the first hole so as to engage in a locking relation with an edge of the plate defining the first hole at said far side of plate to prevent withdrawal of the stud therefrom and thereby secure the base portion of the mounting clamp at the near side of the mounting plate; and locking means including a second base portion at the far side of the plate, said second base portion having a cavity therein to receive a portion of the first mentioned stud extending from the first hole at said far side of the plate, and a second stud extending from the second base portion through the second hole into the cavity in the first mentioned base portion of the clamp adjacent the near side of the plate to prevent an angular movement of the clamp relative to the mounting plate.

3. An electrical component mounting clamp comprising a member formed of a resilient plastic electrical insulating material, said member including a base, spaced side arm portions upstanding from the base, said arm portions and base having an inner surface so shaped as to conform to the contour of an electrical component to be engaged there-between, the base of said member including a downwardly extending portion thereof with a chamfered free end adapted for insertion under a pressure into a hole of smaller dimension defined by an edge of a relatively thin wall mounting plate, the inner surface of said base having a recess therein positioned above said downwardly extending portion for receiving an end of a tool for applying said pressure to the downwardly extending portion, the material of the downwardly extending portion being adapted to be compressed and elongated under the aforesaid pressure by the hole defining edge at an upper side of the plate.

4. In a mounting clamp assembly, the combination comprising a thin wall mounting plate, a member formed of a resilient plastic electrical insulating material, said member including a base, spaced side arm portions upstanding from the base, said arm portions and base having an inner surface so shaped as to conform to the contour of an electrical component to be engaged there-between, the base of said member including a downwardly extending stud portion thereof with a chamfered free end, the thin wall mounting plate having a hole therethrough and a countersunk entry at an upper side of the plate to accept the chamfered end of the stud portion upon the application of a pressure thereto, the stud portion having a relatively greater cross-sectional dimension than the hole, the inner surface of said base having a recess therein positioned above said downwardly extending stud portion for receiving an end of a tool for applying said pressure to the downwardly extending stud portion, said base having an annular channel therein around said downwardly extending stud portion so as to clear a ramp portion on the plate around said hole and permit the base to rest along an adjacent surface of the plate, the material of the stud portion being adapted to be compressed and elongated under the aforesaid pressure by an edge of the plate defining the hole at an upper side of the plate so as to extend through the hole in the plate, and the material of the stud portion being adapted to expand upon subsequently extending through the hole in the plate so as to engage in a locking relation with an edge of the plate defining the hole at a lower side of the plate to prevent withdrawal of the stud portion therefrom and to effectively secure the member to the mounting plate at the upper side thereof.

5. In a mounting clamp assembly, the combination comprising a thin wall mounting plate, a member formed of a resilient plastic electrical insulating material, said member including a base, spaced side arm portions upstanding from the base, said arm portions and base having an inner surface so shaped as to conform to the contour of an electrical component to be engaged therebetween, the base of said member including a downwardly extending stud portion thereof with a chamfered free end, the thin wall mounting plate having a hole therethrough and a countersunk entry at an upper side of the plate to accept the chamfered end of the stud portion upon the application of a pressure thereto, the stud portion having a relatively greater cross-sectional dimension than the hole, the inner surface of said base having a recess therein positioned above said downwardly extending stud portion for receiving an end of a tool for applying said pressure to the downwardly extending stud portion, said base having an annular channel therein around said downwardly extending stud portion so as to clear a ramp portion on the plate around said hole and permit the base to rest along an adjacent surface of the plate, the material of the stud portion being adapted to be compressed and elongated under the aforesaid pressure by an edge of the plate defining the hole at an upper side of the plate so as to extend through the hole in the plate, and the material of the stud portion being adapted to expand upon subsequently extending through the hole in the plate so as to engage in a locking relation with an edge of the plate defining the hole at a lower side of the plate to prevent withdrawal of the stud portion therefrom and to effectively secure the member to the mounting plate at the upper side thereof, and the free end of said downwardly extending stud portion having a centering recess therein to provide a guide for a drill to effect removal of the stud portion from the mounting plate.

6. A mounting clamp of a resilient plastic material, comprising a base portion, resilient means formed integral with said base portion for receiving a device to be held thereby, a resilient stud formed integral with said base portion and extending therefrom, said stud being adapted for locking engagement in a hole provided in a mounting plate so as to enable the base portion to be secured thereby to said plate, and said base portion having an annular channel therein around said resilient stud so as to clear a ramp portion on the plate around said hole and permit the base portion to rest along an adjacent surface of the mounting plate with a close fit.

References Cited in the file of this patent

UNITED STATES PATENTS

| | | |
|---|---|---|
| 2,805,405 | Batcheller | Sept. 3, 1957 |
| 2,809,004 | Kaufman et al. | Oct. 8, 1957 |
| 2,885,460 | Borresen et al. | May 5, 1959 |
| 2,904,617 | King | Sept. 15, 1959 |

FOREIGN PATENTS

| | | |
|---|---|---|
| 544,618 | Great Britain | Apr. 21, 1942 |
| 599,050 | Great Britain | Mar. 3, 1948 |